Oct. 29, 1963 T. J. KAUFFELD ET AL 3,109,067

SIGNALLING APPARATUS

Filed Sept. 5, 1957 2 Sheets-Sheet 1

INVENTORS
THEODORE J. KAUFFELD
ALBERT D. STERN
BY
Pennie, Edmonds, Morton, Barrows and Taylor
ATTORNEYS Oct. 29, 1963 T. J. KAUFFELD ET AL 3,109,067

SIGNALLING APPARATUS

Filed Sept. 5, 1957 2 Sheets-Sheet 2

INVENTORS
THEODORE J. KAUFFELD
ALBERT D. STERN
BY
Pennie Edmonds Morton Barrows & Taylor
ATTORNEYS

United States Patent Office 3,109,067
Patented Oct. 29, 1963

3,109,067
SIGNALLING APPARATUS

Theodore John Kauffeld, Convent, N.J., and Albert D. Stern, Jamaica Estates, N.Y., assignors to Devenco Incorporated, New York, N.Y., a corporation of New York Filed Sept. 5, 1957, Ser. No. 682,184
7 Claims. (Cl. 179—2)

This invention relates to a unitary combined audio-frequency telephone transmitter microphone and high-frequency radio telephone transistorized oscillator-modulator transmitter. The unit of the invention is adapted to be readily substituted as an immediately operative replacement for a standard telephone microphone unit in a telephone transmitter, a handset, for example, to provide at once wire telephone transmission over a telephone line and limited range radio telephone transmission of speech or sounds impressed on the telephone microphone. Listeners are provided preferably with simple fixed tuned portable radio receivers designed to receive the said radio telephone transmission.

The invention is particularly useful for business conferences and the like, in providing radio telephone reception participation by a plurality of listeners at different points not too remote from the radio transmitter.

To the above described ends, and in accordance with one feature of the invention, there is provided a unitary combined audio-frequency telephone transmitter microphone and high-frequency radio telephone transistorized transmitter, with the transistorized transmitter disposed and arranged wholly within a space provided in the circular cylindrical enclosure of the carbon granule microphone unit of a standard telephone transmitter, for example, that of a handset. Further, and in accordance with the invention, both the microphone and the transistorized transmitter are powered by the line voltage of the conventional telephone line. In this way the need for an additional voltage source is eliminated and installation and operation is greatly simplified.

Another feature of the invention resides in the use of the local wire telephone connecting wires (cords) and the local telephone line as an antenna for radiating the high-frequency energy. Thus the telephone line at once serves as the source of supply of electrical power for the combined systems; as the conductor for the audio-frequency telephone voltages; and, as the antenna for radiating the high-frequency energy.

The invention is adapted also to provide one way radio telephone communication as an auxiliary service in connection with a wire telephone intercommunication system within an airplane or the like, for passengers and crew members equipped with fixed tuned miniature radio receivers. In this way neither the passengers nor the crew members are required to remain at fixed points and may move freely about, all the while hearing the speaker talking into the microphone of the system.

Furthermore, by providing a resistor of proper value connected in circuit at the telephone set in the system the microphone may be used also as a surveillance microphone for radio telephone transmission only. Thus sound or speech occurring in the immediate vicinity of the microphone will modulate the constantly operating transistorized radio-frequency oscillator-modulator without requiring the handset, for example, to be lifted and used for wire telephone transmission on the intercommunication system.

These and other features, aspects and advantages of the invention will be apparent to those skilled in the art from the following more detailed description when considered in conjunction with the accompanying drawings, in which.

Figure 1:
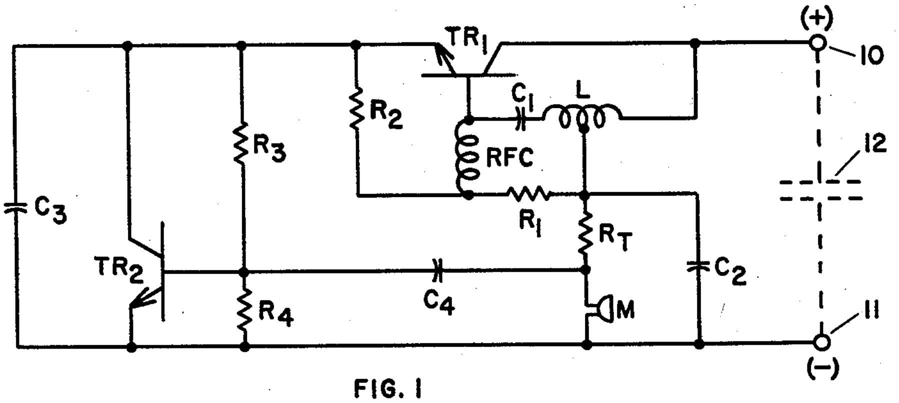
FIG. 1 is a schematic circuit diagram of a unitary audio-frequency telephone transmitter microphone and a frequency modulated radio telephone transistorized oscillator-modulator transmitter in accordance with the invention.
Figure 5:
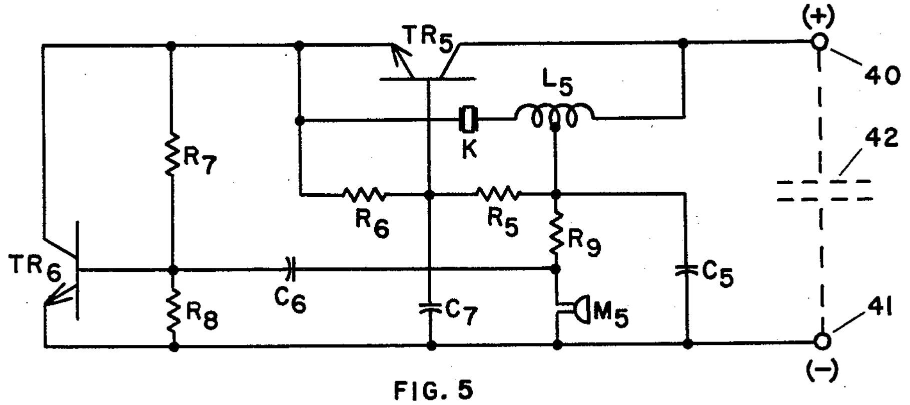
Figure 3:
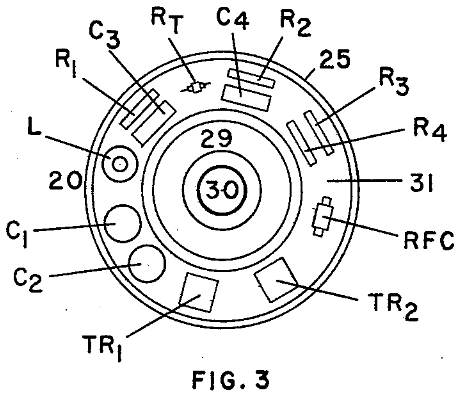
Figure 2:
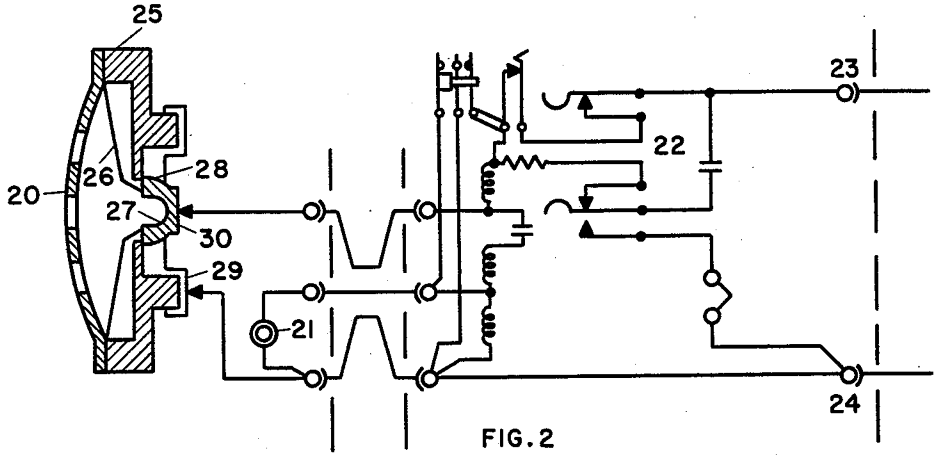
FIG. 2 is a diagram of the conventional circuit at a standard handset telephone, the transmitter microphone unit being shown enlarged and in section.
Figure 4:
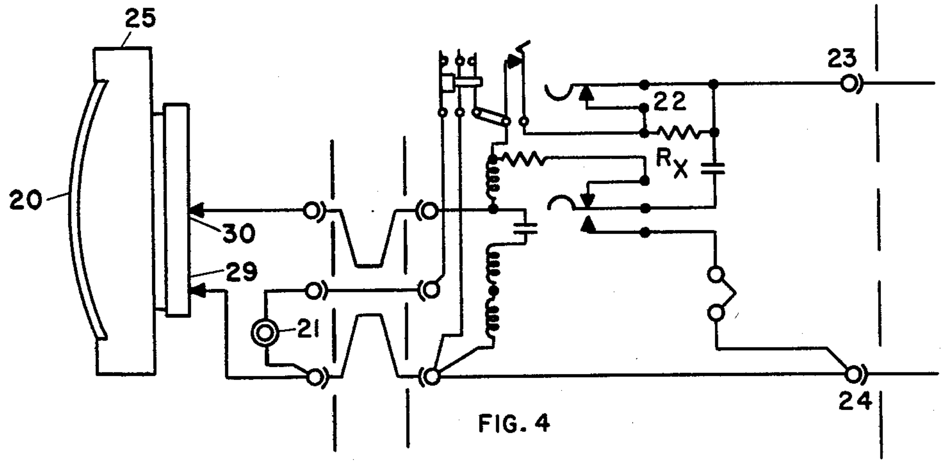

FIG. 3 is a top view in section of the unitary combined audio-frequency telephone transmitter microphone and frequency modulated radio telephone transmitter in accordance with the invention, showing the several components of the transistorized oscillator-modulator circuit of FIG. 1, disposed and arranged wholly within the cylindrical enclosure of the microphone unit of a standard handset telephone transmitter;

FIG. 4 shows the unit of FIG. 3 substituted for and replacing the transmitter microphone unit of FIG. 2 in the conventional circuit at a standard handset telephone, and providing in accordance with the invention wire telephone transmission over the telephone line and limited range radio telephone transmission by radiation from the telephone cords and the telephone line as an antenna; and FIG. 5 is a schematic circuit diagram of a unitary combined transmitter like FIG. 1 in accordance with the invention, adapted to provide amplitude modulated radio telephone transmission with a crystal controlled transistor-oscillator.

Referring now to the drawings, the circuit of FIG. 1 includes a transistor-oscillator comprising the radio-frequency NPN transistor $TR_1$; the inductance L, a 43 $\mu$h toroidal coil tapped at ⅜ turns; the capacitor $C_1$, a 500 $\mu\mu$f ceramic capacitor; the capacitor $C_2$, a 0.01 $\mu$f capacitor; the capacitor $C_3$, of the same value as $C_1$; the resistor $R_1$, of 20–30K ohms; the resistor $R_2$, of the same value as $R_1$; and the ferrite choke RFC, of 500 $\mu$h.

The transistor-modulator of FIG. 1 comprises the audio-frequency NPN transistor $TR_2$; the carbon granule microphone M, which is preferably that of a standard telephone transmitter; the capacitor $C_4$, of 3.0 $\mu$f; the resistor $R_3$, of 0.5–5K ohms; and the resistor $R_4$, of 5–15K ohms. The thermistor $R_t$ has a resistance of 70 ohms at 100 milliamperes and 2,000 ohms at 6–7 milliamperes, and serves to regulate the direct current potential to the transistor circuits. The circuit of the system of FIG. 1 is adapted to be connected in the standard telephone handset, for example, and to the telephone line as shown in FIG. 4.

The values given above for resistors $R_1$, $R_2$, $R_3$ and $R_4$, may require some adjustment within the limits stated in order to obtain optimum operating conditions with the transistors, as is well understood.

For operation of the circuit as shown in FIG. 1 the polarity of the telephone line voltage at the contact electrodes 10, 11 is required to be as shown, namely, positive (+) at 10, and negative (−) at 11. Should the polarity be negative (−) at 10, and positive (+) at 11, it is necessary to use PNP transistors at $TR_1$ and $TR_2$, respectively, and to use resistors of the following values; $R_1$, 40–100K ohms; $R_2$, 10–50K ohms; $R_3$, 100K ohms; and $R_4$, 10K ohms.

The circuit arrangement of FIG. 1 is one that provides frequency modulation of the transistor-oscillator $TR_1$, L, $C_1$, $C_2$, $C_3$, $R_1$, $R_2$ and RFC by the transistor-modulator $TR_2$, M, $C_4$, $R_3$ and $R_4$.

Referring now to FIG. 2, when the standard handset telephone comprising a carbon granule microphone telephone transmitter 20 and receiver 21, is lifted, the cradle switch 22 connects the telephone line 23, 24 and its line voltage to the transmitter 20 and receiver 21, so that when connection with another telephone is made after dialing, wire telephone communication may be had therebetween. The general circuit arrangement of FIG. 2 is typical of the standard hand telephone desk set and is well understood. It needs no further explanation.

The carbon microphone 20 of FIG. 2 is shown enlarged and in section for the purpose of illustrating the physical disposition of its several components, its cylindrical enclosure 25, its diaphragm 26 which actuates the vibratile electrode 27, in relation to fixed electrode 28, between which bounding electrodes the carbon granules are interposed. Contact electrodes 29, 30 provide means for connecting the microphone 20 in the telephone circuit.

FIG. 3 shows the physical disposition and arrangement of the several components of the circuit of FIG. 2 wholly within the cylindrical enclosure 25 of the microphone unit 20. Like numerical designations are used for the components shown in FIGS. 1 and 3, respectively. If required, the carbon granule microphone unit 20 may be replaced with a smaller carbon button microphone or with a smaller standard telephone microphone of the operators type, for example, if added space is required for the accommodation of the radio transmitter components.

In accordance with the invention the combined microphone and transistorized radio-frequency transmitter unit 20 shown in FIG. 3 connected in the circuit relation of FIG. 1, may be substituted in FIG. 2 for and in replacement of the carbon microphone 20 thereof. As a result of such substitution and replacement which may be readily effected the system of FIG. 4 is obtained. It will be noted that the typical local telephone circuit of FIG. 2 is employed in FIG. 4, except that in FIG. 4 a resistor $R_x$ has been added for a purpose to be explained.

In FIG. 4 when the handset is lifted from the cradle the switch 22 is moved to the talking position as shown, and the telephone transmitter microphone 20 and the telephone receiver 21 are then connected to the telephone line and to another local station, assuming a dialing operation has been performed. The line voltage is applied at the contact electrodes 29, 30 and this serves to power both the carbon microphone transmitter 20 and the radio-frequency transistorized oscillator-modulator arranged within the enclosure 25. The transistors require only about 5% of the usual microphone current for power so that no significant diminution occurs in the normal operation of wire telephone transmission.

Both sides of the conversation (audio modulated voltages) appearing across the microphone 20 in FIG. 4 (connected as in FIG. 1) are coupled into the transistor audio-frequency amplifier modulator $TR_2$, whereupon the transistor-oscillator $TR_1$ is frequency modulated. The frequency modulated radio-frequency telephone signals are conducted by way of the contact electrodes 29, 30 to the telephone line 23, 24. The connecting coils and telephone line in turn radiate the frequency modulated signals. Thus the telephone line serves both as a means for supplying power and as an antenna.

A typical telephone transmission line exhibits a capacitance of several hundred $\mu\mu$f when measured at two megacycles per second across the microphone transmitter contact electrodes of a standard handset type telephone. In accordance with the present invention that capacitance value is used to determine the proper inductance value for the toroidal inductance L (FIG. 1) to resonate in the 1.7 to 2.5 mc. frequency range. That frequency range was chosen because of considerations related to the stability of performance of the transistor-oscillator and to attain operation in the "quiet region" of the radio-frequency spectrum.

If it is desired to use the system of FIG. 4 for surveillance of sounds occurring in the near vicinity of the microphone when the handset is resting on the cradle, a resistor $R_x$ (of 7–12K ohms) may be connected as shown. In this way the telephone line voltage is continuously supplied to the microphone and radio-frequency transmitter, whereupon sound or speech occurring in the vicinity of the microphone will modulate the constantly operating transistorized radio-frequency oscillator-modulator without requiring the handset to be lifted from its cradle.

The circuit of FIG. 1 comprises a frequency controlled oscillator system having the oscillator-transistor $TR_1$, including its base, emitter, and collector electrodes, a source of direct current potential supplied at terminals 10, 11, with the polarity indicated, that of the standard voltage of a telephone line, and a tank circuit whose capacitance 12, is that presented by the telephone line and effective between the positive and negative terminals 10, 11. The inductance of the tank circuit which resonates with the inherent capacitance 12, is the tapped coil inductance L, one terminal of which is connected to the collector electrode of transistor $TR_1$ and the other of which is connected through condenser $C_1$ to the base electrode of transistor $TR_1$ The tap of inductance L is connected directly through condenser $C_2$ to the negative terminal 11, and through thermistor $R_t$ to one terminal of the carbon microphone M, the other terminal of microphone M being connected to negative terminal 11. The junction of the connection of thermistor $R_t$ with microphone M is connected through condenser $C_4$ to the base electrode of audio modulator transistor $TR_2$. The base electrode of transistor $TR_2$ is connected to its collector electrode through resistor $R_3$, and said collector electrode is directly connected to the emitter electrode of the frequency modulated oscillator-transistor $TR_1$. The base electrode of audio modulating transistor $TR_2$ is also connected through resistor $R_4$ to negative terminal 11. The emitter electrode of transistor $TR_2$ is connected directly to one terminal of microphone M, and to the negative terminal 11. The condenser $C_3$ is connected across the collector and emitter electrodes of transistor $TR_2$.

The circuit of FIG. 5, an amplitude modulated system, comprises a crystal controlled oscillator system having the oscillator-transistor $TR_5$, including its base, emitter, and collector electrodes, a source of direct current potential supplied at terminals 40, 41, that of the standard voltage of a telephone line, and a tank circuit whose capacitance 42 is that presented by the telephone line and effective between the positive and negative terminals 40, 41. The inductance of the tank circuit which resonates with the inherent capacitance 42 is the tapped inductance $L_5$, one terminal of which is connected to the collector electrode of transistor $TR_5$ and the other of which is connected through the frequency controlling crystal K to the emitter electrode of transistor $TR_5$. The tap of inductance $L_5$ is connected directly through condenser $C_5$ to the negative terminal 41 and through resistor R9 to one terminal of the carbon microphone $M_5$, the other terminal of microphone $M_5$ to negative terminal 41. The junction of the connection of resistor $R_9$ with microphone M is connected through condenser $C_6$ to the base electrode of audio modulator-transistor $TR_6$. The base electrode of transistor $TR_6$ is connected to its collector electrode through resistor $R_7$, and the said collector electrode is directly connected to the emitter electrode of the oscillator-transistor $TR_5$. The base electrode of audio modulating transistor $TR_6$ is also connected through resistor $R_8$ to negative terminal 41. The emitter electrode of transistor $TR_6$ is connected directly to one terminal of microphone $M_5$, and to the negative terminal 41.

Since modifications and changes may be required for particular operating requirements, as will be apparent to those skilled in the art, the improvements herein described are not considered to be limited to the embodiments chosen for purposes of disclosure. All modifications which do not constitute departures from the gist and scope of this invention are to be included as defined by the appended claims.

We claim:

1. A unitary combined audio-frequency telephone transmitter microphone and high-frequency radio telephone transistorized transmitter adapted to be substituted as an immediately operative replacement for a standard telephone microphone unit in a wire telephone transmitter comprising a carbon microphone including a fixed electrode and a vibratile electrode, a diaphragm at one side of said microphone adapted to actuate said vibratile electrode in accordance with sound waves impinging thereupon, spaced substantially coplanar concentric electrodes disposed at the opposite side of said microphone providing electrical contact means for connecting said microphone electrodes in an electrical circuit, a circular cylindrical enclosure for said microphone and substantially concentric therewith providing space between the inner wall of said enclosure and the said carbon microphone, a high-frequency radio telephone transistorized transmitter connected to said concentric electrodes including an oscillator and modulator and circuit connections arranged wholly in said space within said enclosure, said microphone connected to said concentric electrodes and to said transmitter modulator to provide modulated voltages in accordance with sound waves impinging thereupon for simultaneous telephone and radio telephone transmission.

2. A unitary combined audio-telephone transmitter microphone and radio telephone transistorized transmitter adapted to be substituted as an immediately operative replacement for a standard telephone microphone unit in a wire telephone transmitter comprising a flat carbon microphone, a flat circular cylindrical enclosure for said microphone, spaced contact electrodes at one face of said enclosure for connecting said microphone in a telephone line circuit, frequency controlled transistorized oscillator and audio-modulation circuits connected to said contact electrodes and arranged wholly within said enclosure and about said microphone, said microphone connected to said contact electrodes and to said audio modulation circuits to provide modulated voltages for both wire telephone and radio telephone transmission when connected in a telephone line.

3. A unitary combined audio-telephone transmitter microphone and radio telephone transistorized frequency modulated transmitter adapted to be substituted as an immediately operative replacement for a standard telephone microphone unit in a wire telephone transmitter comprising a flat carbon microphone, a flat circular cylindrical enclosure for said microphone, spaced contact electrodes at one face of said enclosure for connecting said microphone to a telephone line circuit, a transistor-oscillator having an inductance adapted to resonate with the capacity of the telephone line when connected to a telephone line circuit, a transistor audio modulator provided to frequency modulate said oscillator, said transistor-oscillator and said transistor audio modulator arranged wholly within said enclosure and about said microphone, said microphone connected to said modulator and to said contact electrodes to provide modulated voltages in accordance with sound waves impinging thereupon to said audio modulator and to a telephone line when connected in a telephone line, said oscillator connected to said contact electrodes to provide frequency modulated radio voltages to a telephone line for radiation thereby.

4. A unitary combined audio-telephone transmitter microphone and radio telephone frequency modulated transistorized transmitter adapted to be substituted as an immediately operative replacement for a standard telephone microphone unit in a wire telephone transmitter comprising a carbon microphone, an audio modulator-transistor circuit including said microphone, a frequency controlled oscillator transistor circuit modulated by said audio modulator, telephone line connected to said oscillator, modulator and microphone providing a D.-C. operating voltage, said oscillator having a tank circuit including a tapped inductance selected to resonate with the capacity presented by said telephone line.

5. In combination, a telephone line providing a voltage, a unitary combined audio-telephone transmitter microphone and radio telephone frequency modulated transistorized transmitter, with said transmitter modulated by said microphone, said unit being arranged wholly within a flat circular cylindrical enclosure with external contact electrodes for connection in a standard telephone handset, said telephone line providing at once a circuit for audio-telephone voltages produced with said microphone, a radiator for radio voltages produced with said transmitter, and a power source for said microphone and said transistorized transmitter.

6. An oscillator of the character described comprising a transistor having base, emitter, and collector electrodes with the collector electrode directly connected to an output connection electrode for a telephone line, a tank circuit including a tapped toroidal inductance selected to resonate at a desired operating frequency with the capacity presented by the telephone line, one terminal of said toroidal inductance being connected directly to said collector electrode, and the other terminal of said toroidal inductance being connected in series with a capacitor to said base electrode, and a radio frequency choke coil and a resistor in series being connected between said base electrode and the tap on said toroidal inductance with a radio-frequency by-pass capacitor connected between said tap and a second output connection electrode for said wire telephone line.

7. A frequency controlled oscillator system of the character described comprising a transistor having base, emitter, and collector electrodes, adapted to be associated with a wire telephone line, a tank circuit including a tapped toroidal inductance adapted to resonate with the capacity presented by the telephone line, one terminal of said toroidal inductance being connected directly to said collector electrode, and the other terminal of said toroidal inductance being connected in series with a capacitor to said base electrode, a radio frequency choke coil and a resistor in series being connected between said base electrode and the tap on said toroidal inductance, an audio modulator-transistor having base, emitter, and collector electrodes, resistors connected between said modulator base electrode and said collector and emitter electrodes, respectively, said modulator collector electrode being connected directly to said oscillator emitter electrode, a radio-frequency by-pass capacitor connected between said oscillator emitter electrode and said modulator emitter electrode, a carbon microphone including two terminals therefor, a connection between the said modulator base electrode and the first terminal of said microphone including a capacitor in series, a direct connection between the said modulator emitter electrode and the second of said microphone terminals, a connection between the first of said microphone terminals and the tap on said toroidal inductance including a thermistor in series, a first external contact electrode connected to said oscillator collector and a second external contact electrode connected to the second terminal of said microphone, whereby said microphone provides modulated voltages in accordance with sound waves impinging thereupon for simultaneous telephone and radio telephone transmission when said contact electrodes are connected to a wire telephone line of standard voltage.

No references cited.